March 18, 1952

C. L. ASH 2,590,061

INDUSTRIAL LIQUID COOLER AUTOMATIC
LIQUID LEVEL CONTROL

Filed Sept. 1, 1949

Inventor:
Clarence L. Ash,
by *William G. Edwards, Jr.*
His Attorney.

Patented Mar. 18, 1952

2,590,061

UNITED STATES PATENT OFFICE 2,590,061

INDUSTRIAL LIQUID COOLER AUTOMATIC LIQUID LEVEL CONTROL

Clarence L. Ash, Churubusco, Ind., assignor to General Electric Company, a corporation of New York Application September 1, 1949, Serial No. 113,643

2 Claims. (Cl. 62—7)

This invention relates to refrigerating equipment and in particular to an industrial application for supplying a fixed quantity of cooled liquid at a predetermined temperature.

In many manufacturing processes—in the industrial baking trade, for instance—it is necessary to supply a predetermined quantity of liquid at a set temperature. In addition, in order to meet the requirements of the industry, it is desirable to provide a system that will automatically accept liquid from an outside source under pressure, cool the liquid to the required temperature, and then supply the proper amount of liquid to a container or mixing vat. It is important, therefore, that during the draw-off period, liquid from the source not enter the cooling container to disturb the temperature of the liquid entering the mixing vat.

Broadly this invention comprises a tank with a cooling means therein, an apparatus that automatically controls the supply of liquid from an outside source to the cooling tank, the apparatus being responsive to the liquid level within the cooling tank and to the flow of cooled liquid in a discharge tube that connects the refrigerating tank with a mixing vat.

An object of this invention is to arrange a liquid cooling apparatus so that a cooling tank cannot be filled during the draw-off period, but is refilled immediately after the draw-off period.

A further object of this invention is to provide an apparatus that supplies a predetermined quantity of liquid at a definite temperature to a mixing vat, or the like.

Further objects and advantages of this invention will become apparent and the invention will be better understood from the following description referring to the accompanying drawing, and the features of novelty which characterize this invention will be pointed out with particularity in the claims annexed to and forming a part of this specification.

Figure 1:
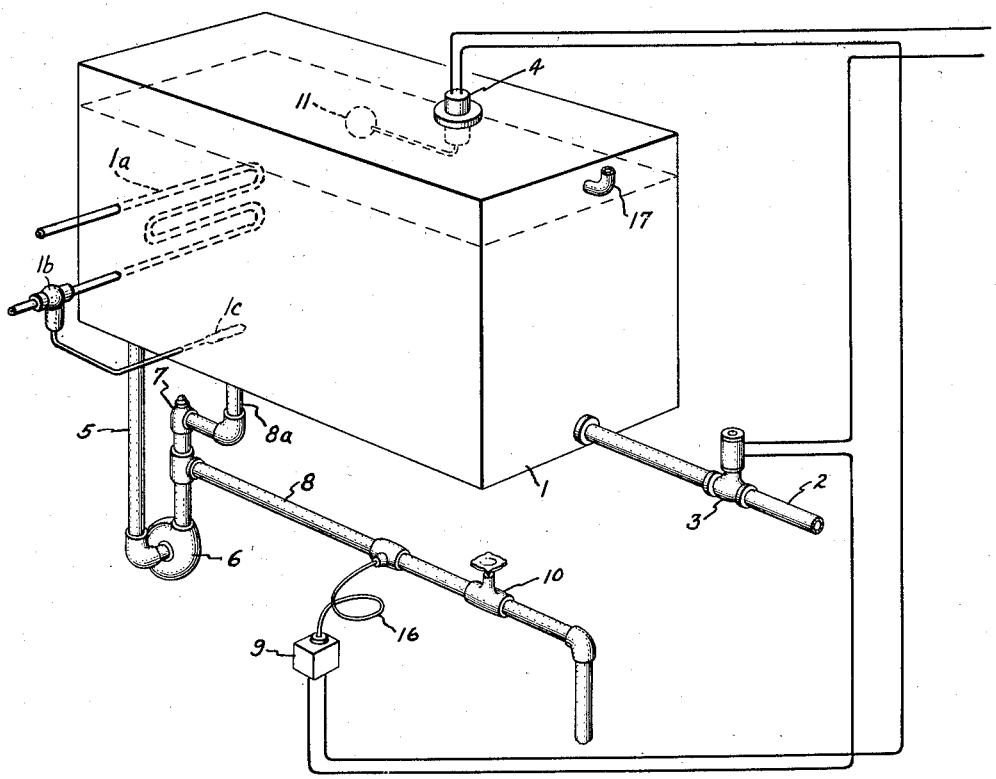
Figure 2:
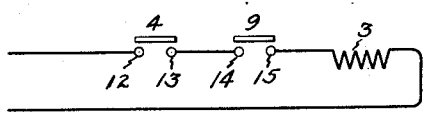

Fig. 1 is a perspective view of the industrial liquid cooler; while Fig. 2 shows a schematic wiring diagram for the control apparatus.

Referring to Fig. 1, a liquid cooling apparatus comprises a cooling tank 1, a liquid level float switch 4, an inlet 2, a control valve 3, a pump 6 driven by a suitable motor (not shown), a bypass valve 7, and an outlet pipe 8, to which there is connected a low pressure switch 9 and a control valve 10.

The cooling tank for the liquid is of any suitable dimensions having a closed top and contains within its walls or within the liquid storage space a cooling coil 1a of any suitable type supplied with refrigerant in any suitable manner and which is provided with a suitable thermostatic control such, for example, as a valve 1b controlled by a bulb 1c for maintaining a predetermined temperature of the liquid within the tank. While this disclosure deals with a refrigerating tank, it is to be understood that the use of a heating arrangement would involve no change in the invention. The inlet 2 supplies liquid under pressure from any suitable source of supply (not shown) to the refrigerating chamber or tank 1. An electrically operated valve 3, which when opened, permits liquid to run from the source into refrigerating container 1, is located in inlet 2. A switch 4 is located in the top of tank 1 and is arranged to be operated by a ball float 11. The float 11 rises with the incoming liquid and, at a predetermined level, opens a set of contacts 12, 13 within the switch 4 thus opening the circuit of the electrically operated valve 3, causing the valve to close. When the ball float lowers as liquid from the tank is being emptied into a mixing vat (not shown), the contacts within switch 4 close.

An outlet 5, which conducts the cooled liquid to the circulating pump 6, is connected to the bottom of refrigerating tank 1. The liquid is circulated by pump 6, and, except when it is desired to fill the mixing vat, passes through check valve 7 and a conduit 8a, back into the refrigerating tank 1. The liquid within tank 1 is circulated continuously by means of pump 6 thus maintaining an even temperature within the tank. Check valve 7 is preferably designed to open at a pressure slightly below the output pressure of the circulating pump; consequently, when valve 10 in outlet line 8 is closed, valve 7 opens, allowing the liquid to circulate within refrigerating tank 1.

An outlet conduit 8 connects circulating pump 6 to a mixing vat where the liquid is to be used. A valve 10, which is either manually or electrically operated, is in line 8 and controls the liquid flow from the pump 6 to the mixing vat.

A low pressure switch 9 is responsive to the pressure within the outlet line 8, since it is connected thereto by a tube 16. When valve 10 is closed, the low pressure switch has the same pressure as that of the liquid which passes through the check valve 7, and under those circumstances a pair of contacts 14, 15 within switch 9 are closed. When valve 10 is open, however, the velocity of the liquid passing through outlet pipe 8 causes a drop in pressure therein, and in tube 16, causing contacts 14, 15 in switch 9 to open. Open contacts 14, 15 break the circuit to the electrically operated valve 3, preventing its opening while liquid is running through tube 8. Consequently, even though ball float 11 drops with the liquid level within tank 1 to the point where contacts 12, 13 in switch 4 close, the low pressure of the liquid exiting through pipe 8 to the mixing vat causes a drop in the pressure within tube 16, resulting in the opening of contact points 14, 15 within switch 9, keeping the circuit of electrically operated valve 3 open and preventing liquid from flowing through inlet pipe 2 to the refrigerating chamber.

When the desired amount of liquid has been drained from refrigerating tank 1, valve 10 is closed and, as a result, the pressure within outlet tube 8 becomes equal to the output pressure of pump 6. The increase in pressure in tube 8 closes contacts 14, 15 within switch 9. Since the lowering of the liquid level in tank 1, closed contacts 12, 13 in switch 4, and the closing of valve 10 caused the contacts 14, 15 in switch 9 to close, there is a completed circuit to electrically operated valve 3; consequently, valve 3 opens and liquid flows from the source of supply through inlet tube 2 to the refrigerating chamber 1.

Although valve 10 is shown in Fig. 1 as a manually operated valve, it is apparent that there may be employed instead an electrically operated valve which operates at the will of the operator of the mechanism, or which automatically closes when the required amount of liquid has drained from the cooling tank.

A vent tube 17, shown in the side of the refrigerating tank, is provided to keep the pressure within the tank equal to the atmospheric pressure.

In Fig. 2, contact points 12, 13 of switch 4 and 14, 15 of switch 9 are schematically shown in the open position in series with electrically operated valve 3. This diagram indicates that both switch 4 and switch 9 need be closed before the electrically operated valve 3 opens to permit liquid to flow from the source into the refrigerating tank.

The operation of the subject invention is as follows: Starting with an empty tank, float valve 11 is at a low position, closing the contact points 12, 13 in switch 4, and with valve 10 closed, contacts 14, 15 in pressure switch 9 are closed. The circuit for valve 3 is energized, opening the valve and permitting liquid to flow from the source under pressure through inlet 2 into refrigerating chamber 1. As the liquid within the chamber rises to the predetermined level, float valve 11 rises with the liquid, opening contacts 12, 13 of switch 4, opening the circuit to electrically operated valve 3, closing valve 3, which prevents further influx of liquid from the source to refrigerating tank 1. Then, circulating pump 6 is started to agitate the liquid within the tank. The liquid flows through outlet 5 to circulating pump 6, through check valve 7 and tube 8a back into the refrigerating chamber.

When it is desired to direct the cooled liquid into the mixing vat, valve 10 is opened either manually or electrically, whereupon the liquid from circulating pump 6, instead of going through check valve 7, exits through line 8 to the mixing vat. The flow of the liquid in tube 8 causes a reduction in pressure in tube 16, opening the contacts 14, 15 in the switch 9.

When the level of the liquid within the tank 1 decreases to the point where contacts 12, 13 in switch 4 are closed by ball 11 lowering with the liquid level, liquid does not flow through inlet 2, since the contacts 14, 15 in switch 9 remain open until the desired amount of liquid has been pumped out of the tank. Contacts 14, 15 in switch 9 close, however, when the required amount of liquid has been drained from the tank completing the circuit to the electrically operated valve 3. Valve 3 then opens, and liquid flows through the valve into the refrigerating tank and the cycle is repeated. It is to be understood, of course, that valve 10 is closed after the required liquid has been drained from the tank.

With the apparatus used in this invention, it can be seen that liquid is prevented from flowing from the source into the refrigerating tank while the liquid which has been cooled is running from the tank into the mixing vat; consequently, all the liquid that flows from the tank into the mixing vat is at the desired predetermined temperature.

Modifications of this invention will occur to those skilled in the art and it is desired to be understood, therefore, that this invention is not to be limited to the particular arrangement disclosed, but that the appended claims are meant to cover all the modifications within the spirit and scope of this invention.

What I claim as new and desire to secure by Letters Patent of the United States is:

1. In a liquid cooling apparatus comprising a tank and means for cooling liquid in the tank to a predetermined temperature, said tank having a fresh liquid inlet and a cool liquid outlet having a valve therein, a control system for preventing the admission of fresh liquid to said tank during the withdrawal of cool liquid therefrom, said system comprising a valve in said inlet and an energizing circuit therefor, first and second switches in series in said circuit, means dependent upon the liquid level in said tank for opening said first switch at a predetermined maximum liquid level, means responsive to a reduction in pressure of liquid in said outlet resulting from opening of the valve therein for opening said second switch, whereby said inlet valve may be energized only when said liquid in said tank is below said predetermined level and said outlet valve is closed.

2. In a liquid cooling apparatus comprising a tank and means for cooling liquid in the tank to a predetermined temperature, said tank having a fresh liquid inlet including a valve in said inlet, a circulating pump for circulating liquid within said tank, a liquid conduit from said tank to said pump, a return conduit from said pump to said tank, a check valve in said return conduit, an outlet for withdrawing cooled liquid from said tank, said outlet connected to said return conduit between said pump and said check valve, a flow control means in said outlet maintaining said check valve open except when said flow control means is open, an energizing circuit for said inlet valve, first and second switches in series in said circuit, means dependent upon the liquid level in said tank for opening said first switch at a predetermined maximum liquid level, means responsive to a reduction in pressure of liquid in said outlet resulting from opening of the valve therein for opening said second switch, whereby said inlet valve may be energized only when said liquid in said tank is below said predetermined level and said flow control means is closed.

CLARENCE L. ASH.

REFERENCES CITED

The following references are of record in the file of this patent:

UNITED STATES PATENTS

| Number | Name | Date |
| --- | --- | --- |
| 2,431,721 | Wiseman et al. | Dec. 2, 1947 |
| 2,432,547 | Tull et al. | Dec. 16, 1947 |
| 2,488,435 | Ritter | Nov. 15, 1949 |